United States Patent [19]
Banda et al.

[11] Patent Number: 5,788,402
[45] Date of Patent: Aug. 4, 1998

[54] COUPLING FOR A VEHICLE DISPLACEABLE SAFETY ROLLOVER BAR

[75] Inventors: Ruth Banda; Lothar Heiner, both of Munich, Germany

[73] Assignee: Bayerische Motoren Werke, Aktiengesellschaft, Germany

[21] Appl. No.: 665,849

[22] Filed: Jun. 19, 1996

[30] Foreign Application Priority Data

Aug. 14, 1995 [DE] Germany ................ 195 29 875.6

[51] Int. Cl.⁶ ................................................. B25G 3/20
[52] U.S. Cl. .................. 403/374; 403/322; 403/327; 403/DIG. 1; 403/DIG. 8; 280/756
[58] Field of Search ............... 403/DIG. 1, 374, 403/373, DIG. 8, 322, 321, 325, 326, 327, 328; 283/756, 734, 735, 806

[56] References Cited

U.S. PATENT DOCUMENTS

| | | | |
|---|---|---|---|
| 2,470,256 | 5/1949 | McIlroy | 403/DIG. 8 |
| 4,141,117 | 2/1979 | Van Gompel | 403/374 X |
| 4,148,504 | 4/1979 | Rushing | 280/756 |
| 4,618,900 | 10/1986 | Saito | 403/322 X |
| 4,643,472 | 2/1987 | Schukei | 403/374 X |
| 4,709,454 | 12/1987 | Barnes | 403/322 X |
| 4,900,058 | 2/1990 | Hobrecht | 280/756 |
| 4,906,123 | 3/1990 | Weskamp | 403/322 |
| 5,261,506 | 11/1993 | Jost | 180/282 |
| 5,366,313 | 11/1994 | LaBarre | 403/322 X |
| 5,626,361 | 5/1997 | Heiner | 280/756 |

FOREIGN PATENT DOCUMENTS

| | | |
|---|---|---|
| 2 258 063 | 6/1974 | Germany. |
| 43 07 963 A1 | 9/1994 | Germany. |

*Primary Examiner*—Daniel P. Stodola
*Assistant Examiner*—Bruce A. Lev
*Attorney, Agent, or Firm*—Evenson, McKeown, Edwards & Lenahan, P.L.L.C.

[57] ABSTRACT

A coupling has a first coupling part comprising a holding rod which is provided with a groove for the engagement of locking balls. The locking balls are radially movably arranged in transverse bores of a holding element arranged on a second coupling part. In a non-operative position of the rollover bar, the locking balls are pressed by a cone surface of a locking member into the groove of the holding rod. If the locking member is displaced in a sensor-controlled manner axially against the effect of a spring by an electromagnet, the holding rod is released. To achieve a construction which is as compact as possible and which permits a housing of the coupling also in the very limited space conditions in a motor vehicle, the holding element with the locking balls and the locking member are arranged inside the electromagnet.

20 Claims, 1 Drawing Sheet

COUPLING FOR A VEHICLE DISPLACEABLE SAFETY ROLLOVER BAR

BACKGROUND AND SUMMARY OF THE INVENTION

The present invention relates to a coupling, and more particularly, to a coupling for a safety part of a vehicle, e.g. a rollover bar, which can be displaced from an inoperative position by a drive into an operative position, having a first coupling part in the form of a holding rod which is provided with a groove for the engagement of locking balls which are radially movable in transverse bores of a holding element arranged on a second coupling part and, in the inoperative position of the safety part can be pressed by way of a cone surface of a locking member which can be moved in a sensor-controlled manner into the groove of the holding rod by means of an electromagnet axially against the spring force.

DE 43 07 963 A1 shows a known coupling in which an axially movable locking member is screwed by way of a screwed connection to an activating pin projecting from the electromagnet. Because the entire triggering mechanism with the holding rod, the locking balls and the axially displaceable locking member (or activating sleeve) is arranged outside the electromagnet, a relatively large space is required for the installation of the coupling. This large space frequently does not exist in the narrow space conditions in vehicles.

It is an object of the present invention to provide a coupling of the required construction which needs little space, nevertheless has a simple construction and requires no excessively high precision.

According to the present invention, this object has been achieved by arranging a holding element with locking elements and a locking member inside an electromagnet. Particularly in the displacement direction of the safety part, the new coupling has a very compact construction. In the activating direction of the magnet, there is no additional space requirement because the entire triggering mechanism is integrated in the electromagnet.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 3:
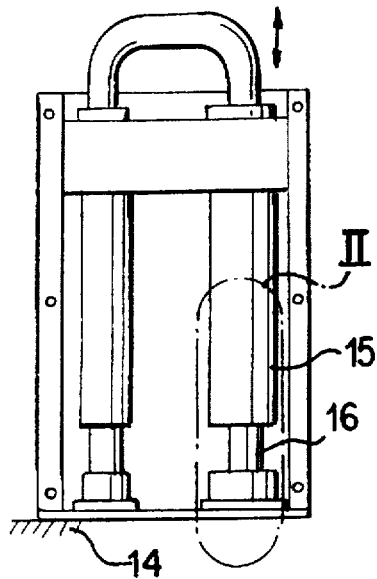
FIG. 3 is an elevational view of a conventional roll bar with the coupling of FIG. 3 shown in the dot-dash portion.

The two illustrated embodiments of a releasable coupling are preferably used for the locking and, as required, for the releasing of a conventional rollover bar of a motor vehicle. The rollover bar as seen in FIG. 3 may be translationally, possibly also on a moving path which is slightly curved in the lateral view, displaceable from a lowered non-operative position, in which it is situated approximately at the level of the window railing line of the vehicle, into an upright operative position in which it protects the vehicle occupants in the event of a vehicle rollover.

Figure 1:
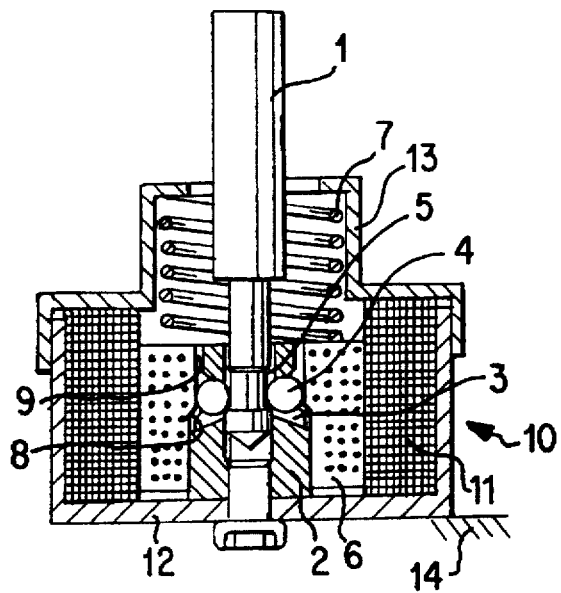
FIG. 1 is a sectional view of a first embodiment of the coupling according to the present invention.

As a first coupling part, the embodiment according to FIG. 1 has a holding rod 1 which, in practice, may also be constructed to be very thin, for example, as a pin of a diameter of 5 to 7 mm. In a manner not shown in detail, the holding rod 1 is connected with the above-mentioned translationally displaceable rollover bar, for example, by way of a transverse yoke. The second coupling part consists of a holding element 2 in which transverse bores 3 are formed for receiving radially movable locking balls 4.

In the locking position illustrated in FIG. 1, the locking balls 4 engage in a flat groove 5 on the exterior circumference of the holding rod 1. Under the effect of a locking member 6, the locking balls 4 are pressed into the groove which, for this purpose, under the effect of a pressure spring 7, is loaded downward as viewed in FIG. 1. The locking member 6 has two internal cones 8, 9. The internal cone 9 forces the balls radially to the inside under the axial spring stressing of the locking member 6.

The holding element 2, the locking balls 4 and the locking member 6 are arranged inside an, electromagnet designated generally by numeral 10. The electromagnet 10 essentially comprises a ring-shaped exterior coil body 11 and a ring-shaped armature which also constitutes the locking member 6 and is movable in an axially limited manner. The armature 6 is surrounded by the coil body 11 and is made of a ferromagnetic material. The electromagnet 10 is enclosed by a housing which comprises an approximately pot-shaped bottom part and a cover 13. The holding rod 1 projects out of the top side of the cover 13. Furthermore, spring 7 is supported against the cover 13. The housing 12 surrounding the electromagnet 10 is arranged on the vehicle body 14, which is only outlined, or on the bottom of a cassette which receives the rollover bar and which, in turn, is again fastened on the vehicle body.

If the coil 11 is excited, the locking member 6 or the ferromagnetic, ring-shaped armature 6 moves upward against the force or bias of the spring 7. Because of the above-described cones 8, 9, the locking balls 4 then move radially to the outside and the holding rod 1 is unlocked. The rollover bar is then displaced from the non-operative position into the upright operative position, frequently under the influence of driving springs, but also hydraulically or pyrotechnically.

The displacement of the rollover bar from the operative position back into the non-operative position can take place by the manual sliding-in of the rollover bar. On its free end, the holding rod 1 has a cone point which, when the cone angle of the two cones 8, 9 is dimensioned correctly, presses the locking balls so far downward and radially outward that the locking balls 4 can penetrate into the flat groove 5 in which they are then held by the locking member 6.

Figure 2:
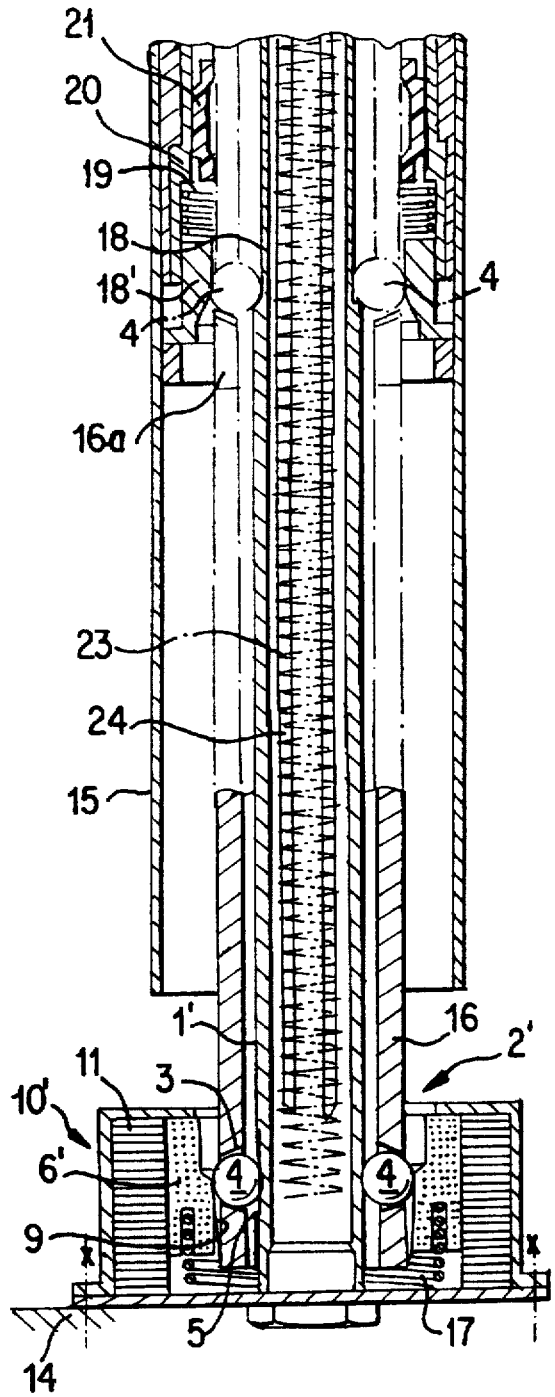
FIG. 2 is a corresponding sectional view of a second embodiment of the coupling according to the present invention.

The embodiment illustrated in FIG. 2 has the holding rod 1' fixedly connected with the outlined vehicle body 14 or an also outlined rollover cassette 15. In its lower area, the holding rod 1' also has a flat groove 5 which cooperates with locking balls 4 in the locking position basically as described above in connection with FIG. 1. In the embodiment of FIG. 2, however, the holding element 2' is arranged on at least one leg end 16 of the rollover bar (which is otherwise not shown again for reasons for clarify and simplicity). It can be recognized that, for this purpose, the holding element 2' may also be formed directly by the lower end 16 of a leg of the rollover bar.

The locking member 6', which is formed by the ring armature of the electromagnet 10' is loaded by a spring 17 into the illustrated locking position. The spring 17 is supported on the bottom of the housing surrounding the electromagnet 10'. The holding rod 1' is provided above the groove 5 for locking the rollover bar in the non-operative position at least with at least one additional groove 18 which is used for fixing the rollover bar in a moved-out position. The moved-out position of the rollover bar is illustrated by the outlined leg end 16a shown in dot-dash lines. It would also be within the scope of the present invention to provide other grooves corresponding to the groove 18 at different level distances in order to fix the rollover bar also when it does not completely reach the moved-out extreme position.

The upper portion of FIG. 2 illustrates a locking sleeve 18' which can be displaced upward against the effect of a spring 19 in an axially limited manner in a guide tube 20 when the rollover bar is moved out but then, when the locking balls 4 enter the groove 18, is displaced by way of the spring so far downward that the locking balls can no longer escape backwards from the groove 18. For a guiding with lower friction and for compensating the tolerance, an elastic plastic guide bush 21 also exists in the guide tube 20.

The guide rod 1' of the embodiment illustrated in FIG. 2 has a hollow construction and, on the inside, accommodates a driving spring 23 for the fast pushing-out of the rollover bar after the excitation of the electromagnet 10'. The driving spring 23 also surrounds a guiding mandrel 24 which is supported farther above (not shown) on the rollover bar or is connected therewith in a generally known manner.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A coupling device for a vehicle rollover bar arranged to be drivingly displaceable from a non-operative position into an operative position, comprising a first coupling part in the form of a holding rod provided with a groove a second coupling part on which a holding element having transverse bores is arranged, and locking balls movably arranged in the transverse bores to positively engage the groove such that, in the non-operative position of the rollover bar, the locking balls are pressable by a cone surface of an axially movable locking member adapted to be controllably moved into the groove by an electromagnet axially against a spring force, wherein the holding element, the locking balls and the locking member are arranged inside the electromagnet to provide an operative relationship between the locking member and the spring biased electromagnet.

2. The coupling device according to claim 1, wherein the locking member has two cone surfaces having different cone angles, with an area with a flatter cone angle in the non-operative position interacting with the locking balls.

3. The coupling device according to claim 1, wherein the axially movable locking member is formed by a ring-shaped armature of the electromagnet.

4. The coupling device according to claim 3, wherein the locking member has two cone surfaces having different cone angles, with an area with a flatter cone angle in the non-operative position interacting with the locking balls.

5. The coupling device according to claim 3, wherein the holding rod is provided on an exterior shell surface thereof with the groove for the engagement of the locking balls.

6. The coupling device according to claim 3, wherein the holding, element, in the non-operative position, is completely surrounded by the ring-shaped armature of the electromagnet.

7. The coupling device according to claim 6, wherein the holding rod is provided on an exterior shell surface thereof with the groove for the engagement of the locking balls.

8. The coupling according to claim 3, wherein the ring armature is loaded by a spring into the locking position is supported on a housing cover of the electromagnet.

9. The coupling device according to claim 3, wherein the ring armature is loaded by a spring in the locking position, with the spring being supported on a bottom of a housing surrounding the electromagnet.

10. The coupling device according to claim 9, wherein the holding element is configured to be arranged on at least one lower leg end of the rollover bar which is translationally displaceable and U-shaped, and the holding rod is adapted to be arranged on one of a vehicle body and on a housing fastened thereto.

11. The coupling device according to claim 1, wherein the holding element is adapted to be arranged on one of a vehicle body and a housing fastened thereto, and the holding rod is configured to be connectable with the vehicle rollover bar.

12. The coupling device according to claim 1, wherein the holding rod is connectable with the rollover bar which is translationally displaceable.

13. The coupling device according to claim 3, wherein the holding element is configured to be arranged on at least one lower leg end of the rollover bar which is translationally displaceable and U-shaped, and the holding rod is adapted to be arranged on one of a vehicle body and on a housing fastened thereto.

14. The coupling device according to claim 3, wherein the holding element is formable by a lower leg end of the rollover bar.

15. The coupling device according to claim 13, wherein, for locking in the non-operative position, the holding rod has at least one additional groove for fixing of the rollover bar in at least a partially moved-out position.

16. The coupling device according to claim 15, wherein a sleeve is arranged to be axially displacable against a spring force within predetermined limits in a stationary guiding tube and is provided interiorally thereof with at least one downwardly expanding cone.

17. The coupling device according to claim 13, wherein the holding rod is hollow to receive a driving spring for the moving-out of the rollover bar.

18. The coupling device according to claim 1, wherein the transverse bores of the holding element, on a side thereof facing away from the groove, widen in an upward and downward direction as viewed in the direction of movement of the locking member.

19. The coupling device according to claim 1, wherein the transverse bores of the holding element, on a side thereof facing the groove, widen in an upward and downward direction as viewed in the direction of movement of the locking member.

20. A vehicle rollover bar arranged to be drivingly displaceable from a non-operative position into an operative position, comprising:

a first coupling part in the form of a holding rod provided with a groove, a second coupling part on which a holding element having transverse bores is arranged and looking balls movably arranged in the transverse bores to positively engage the groove such that, in the non-operative position of the rollover bar, the locking balls are pressable by a cone surface of an axially movable locking member adapted to be controllably moved into the groove by an electromagnet axially against a spring force, wherein the holding element, the locking balls and the locking member are arranged inside the electromagnet.

* * * * *